Figure 1:
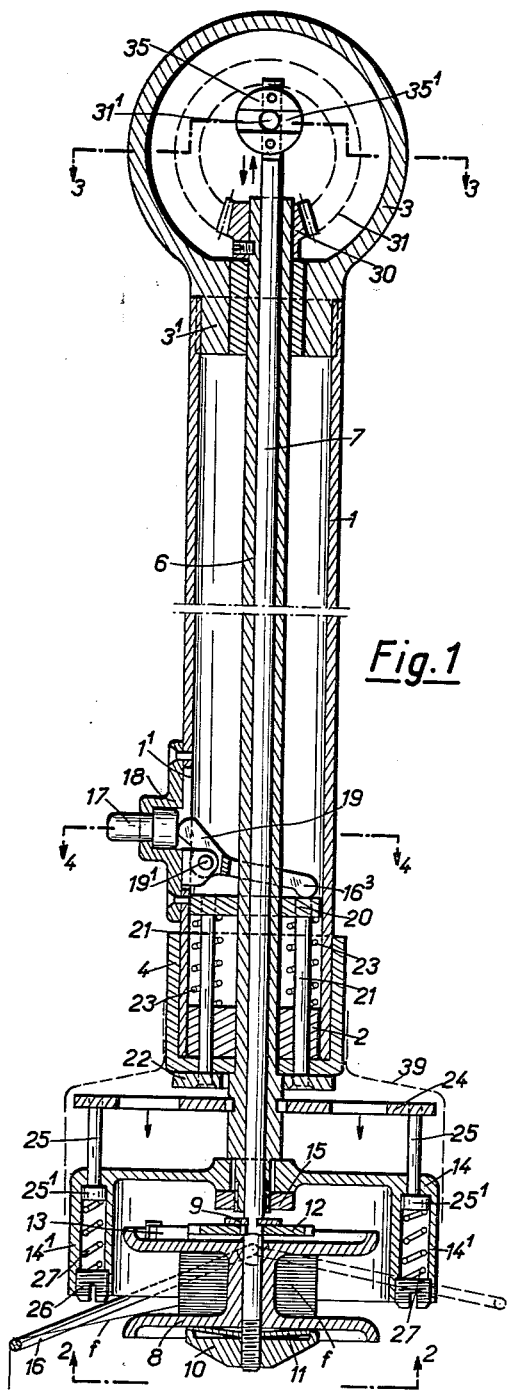

June 25, 1963

C. LOUISON 3,095,158

FISHING REEL AND HANDLE COMBINATION

Filed Feb. 1, 1961

4 Sheets-Sheet 1

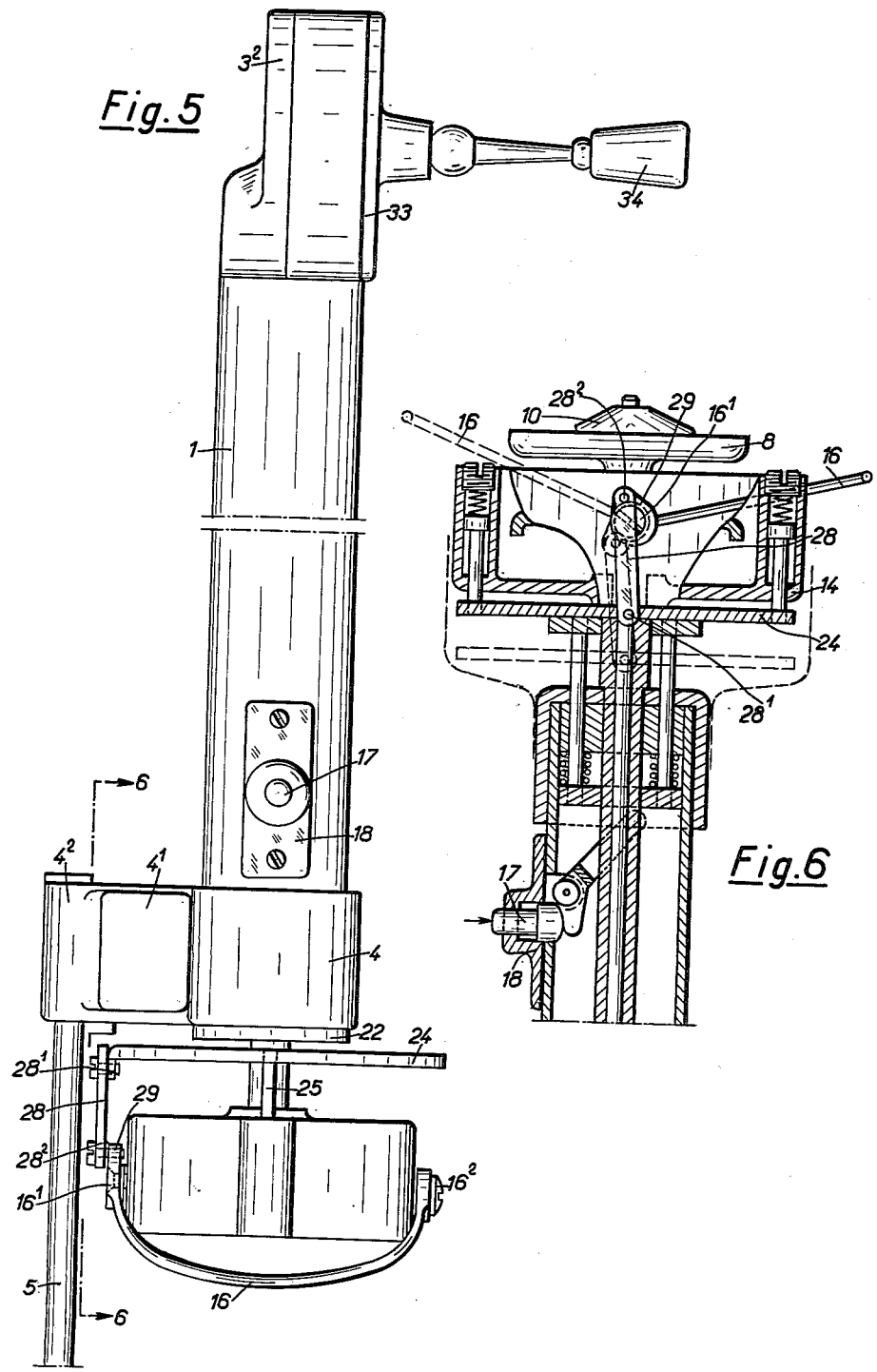

June 25, 1963
C. LOUISON
3,095,158
FISHING REEL AND HANDLE COMBINATION
Filed Feb. 1, 1961
4 Sheets-Sheet 3
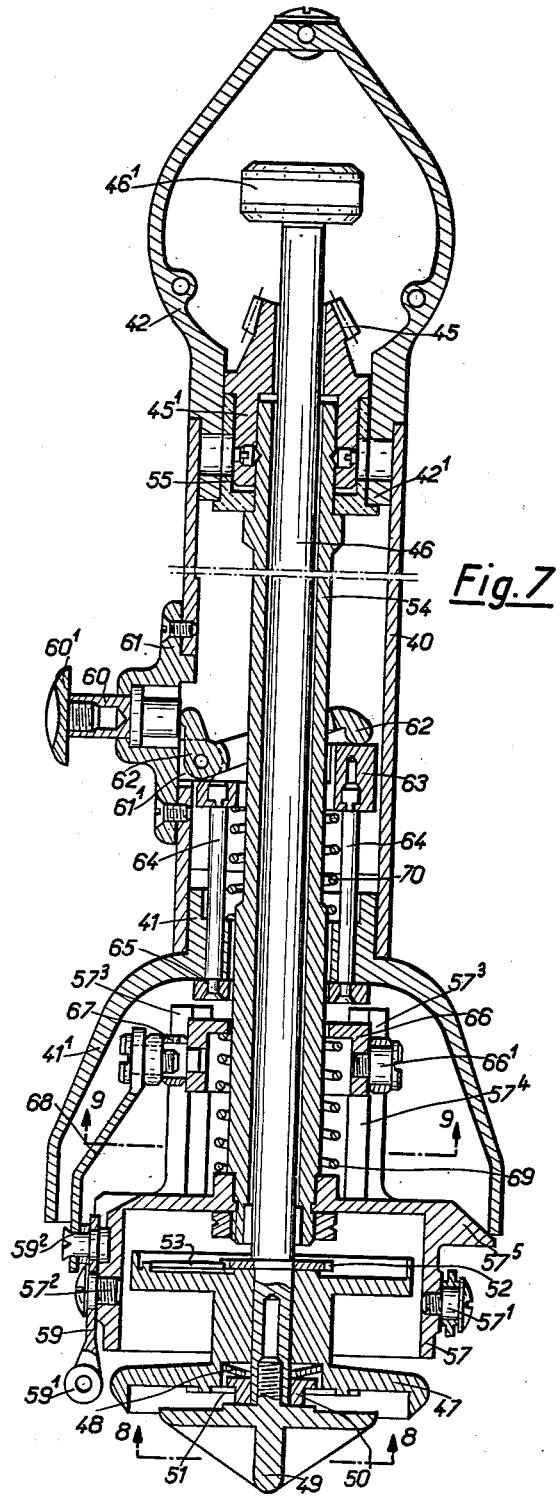
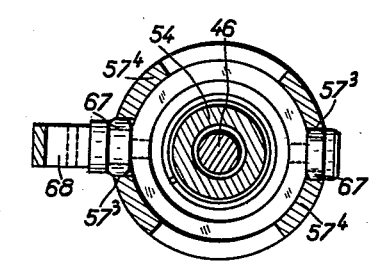
Fig.9
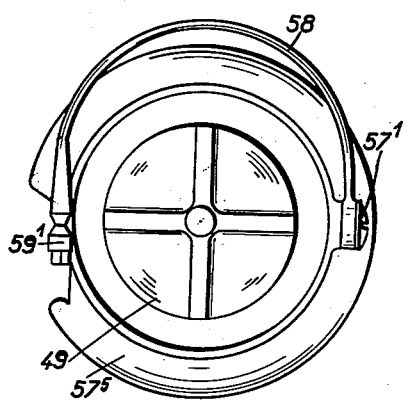
Fig.8

United States Patent Office 3,095,158
Patented June 25, 1963

3,095,158
FISHING REEL AND HANDLE COMBINATION
Claude Louison, Rue de Cotatay, Le Chambon-Feugerolles, Loire, France
Filed Feb. 1, 1961, Ser. No. 86,383
Claims priority, application France Feb. 11, 1960
4 Claims. (Cl. 242—84.21)

The present invention relates to handle and reel combinations.

Handle and reel combinations are known for use with casting rods but are usually complicated, expensive to manufacture and their operation usually necessitates the use of both hands.

An object of the invention is to provide a handle and reel combination which substantially overcomes the above disadvantages.

It is a further object of the invention to provide a handle and reel combination in which control of the reel is possible with the use of only one hand.

According to the present invention there is provided a handle and reel combination comprising a tubular handle in which is disposed a hollow shaft which is adapted for rotation. A spindle is supported within the hollow shaft for movement axially of the shaft. A drum is coupled to the shaft for rotation therewith. There is further provided a winding-up rod supported on the drum and pivotable relative to said drum. There is additionally provided means frictionally connecting a spool to the spindle for axial movement therewith. A crank mechanism is provided for rotating the shaft and reciprocating the handle, and in further accordance with the invention there is provided control means in the handle for pivotably moving the winding-up rod between operative and free-line positions. The crank mechanism is adapted for rotatably driving the shaft, drum and winding-up rod, while reciprocating the spindle to cause winding of line on the spool when the winding-up rod is in the operative position. The control means is operative to pivotally move the winding-up rod to a free-line position whereat line can be unwound from the spool without contacting the winding-up rod. The control means comprises a push-button, a bell-crank lever in contact with the push-button and movable thereby, a ring engaged by the bell crank lever and movable thereby, a slideable rod secured to the ring, a thrust disc and springs between the thrust disc and ring. A contact plate is located adjacent the thrust disc, the latter in turn being secured to said rod for being displaced therewith to engage said contact plate with the button pressed, and means pivotally supported from the contact plate and coupled to the winding-up rod for moving the winding-up rod between the operative and free-line positions.

Figure 3:
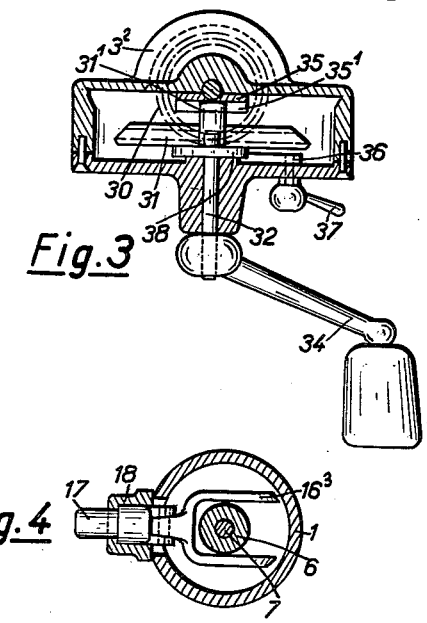
Figure 4:
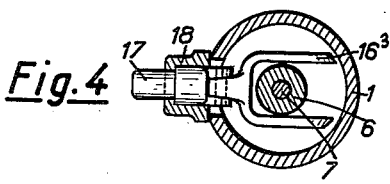
Figure 2:
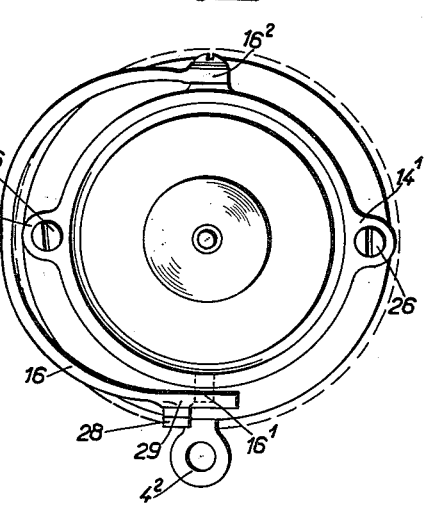
Figure 10:
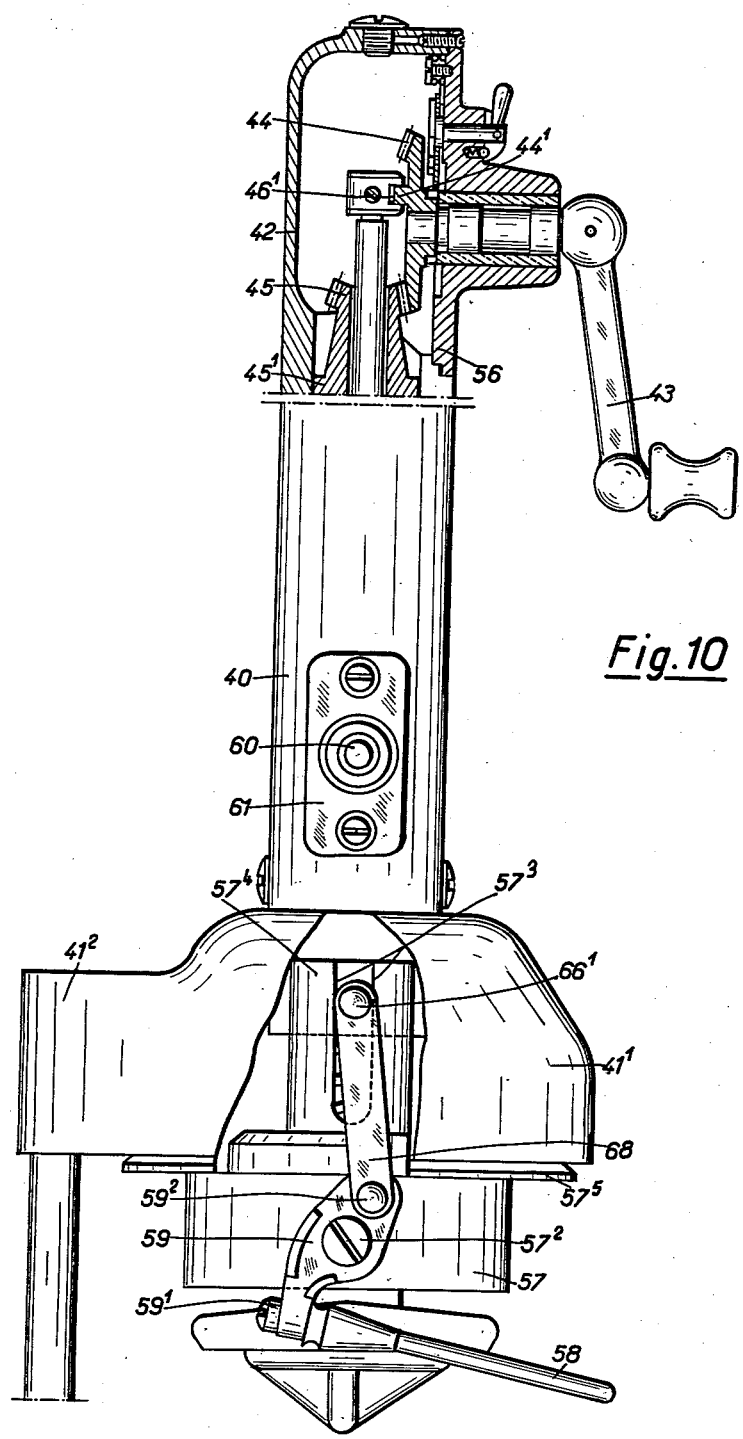

For a better understanding of the invention and to show how the same may be carried into effect, reference will now be made, by way of example, to the accompanying drawings, in which:

FIGURE 1 is an elevation in section of a handle and reel according to the invention, FIGURE 2 is an end elevation taken in the direction of arrows 2—2 of FIGURE 1, FIGURE 3 is a sectional view taken along the line 3—3 of FIGURE 1, FIGURE 4 is a sectional view taken along the line 4—4 of FIGURE 1, FIGURE 5 is a plan view of the handle and reel illustrated in FIGURES 1 to 4, FIGURE 6 is a view taken along the line 6—6 of FIGURE 5 illustrating the forward end of the handle parts of which are shown in section, FIGURE 7 is an elevation in section showing an alternative arrangement of a handle and reel according to the invention, FIGURE 8 is an end elevation taken in the direction of arrows 8—8 of FIGURE 7, FIGURE 9 is a sectional view taken along the line 9—9 of FIGURE 7, and FIGURE 10 is a side elevational view partly in section of the handle and reel and seen at right angles to that illustrated in FIGURE 7.

Referring to the drawings, FIGURES 1 to 6 show a handle and reel combination comprising a cylindrical tubular member 1 which constitutes the handle proper. Alternatively, the handle 1 may be of other than cylindrical shape. Each end of the handle 1 has disposed therein a bearing, the forward end being provided with a bearing element 2 mounted in a known manner in the handle 1 and, the rearward end being provided with a bearing element $3^1$ which is secured to a casing 3 in which is mounted a crank entrainment mechanism.

The forward end of the handle 1 is surrounded with a ferrule 4 with a lateral prolongation $4^1$. A bearing element $4^2$ is secured to the ferrule 4 laterally thereof, and a rod 5 is supported in the bearing element $4^2$. The ferrule 4 is secured on to the tubular end of the handle 1 in a known manner such as for example by screws.

Coaxially mounted in the handle 1 is a hollow cylindrical shaft 6 through which a spindle 7 passes, the said spindle 7 having a fixed angular position, while being able to slide freely axially in the shaft 6. Balls, roller or other bearings (not shown for the sake of simplicity) may be mounted between the shaft 6 and respective bearing elements 2 and $3^1$.

The forward end of the spindle 7 supports a spool 8. The spool 8 is secured to the said spindle by frictional connecting means constituted by a washer 9 disposed on the spindle 7 on one side of the spool, and a nut 10 on the other side of the spool. The nut is threadably engaged with the spindle 7, and by adjusting the position of nut 10 on the spindle, the degree of force securing the spool to the spindle may also be adjusted. Under the effect of a large unwinding force exerted on the line (for example when a "catch" exerts an excessive pull), the spool 8 is able to rotate frictionally on the spindle 7. To permit this, a resilient washer 11 is interposed with a press fit between the spool and the nut 10. The degree of friction is adjusted in accordance with the degree of compression of the washer 11. The angler is made aware of frictional rotation of the spool and thereby of the considerable force exerted on the line, for example by means of a "click" system or other audible means of known type comprising a toothed wheel 12 fast with the spindle 7 and a resilient blade or rod 13 secured laterally against the spool 8 and one of the ends of which cooperates with the teeth of the wheel 12.

The hollow shaft 6 has a shouldered bearing surface forwardly of the ferrule 4. A hollow cylindrical drum 14 is locked, for example by means of a nut 15, against the said bearing surface so that it is rotatable with the shaft 6. The drum 14 surrounds the spool 8.

Mounted about the drum 14 is the line-winding member consisting of a rod 16 which is of circular cross-section and has a generally semi-circular shape. This rod 16 may be formed or shaped in any suitable manner so as to ensure the satisfactory entrainment of the line $f$. The ends of the rod 16 are pivotally mounted at $16^1$ and $16^2$ on the drum 14 so that the said rod 16 can be pivoted about an axis passing through $16^1$ and $16^2$. The rod 16 is commonly known under the name of "bail" or "pick-up."

Rod 16 is capable of occupying two positions, as illustrated in FIGURE 1. The first is a winding-up position (shown in solid lines) in which the spool is rotatable relative to the shaft and drum only upon application of a force to the spool of sufficient magnitude to overcome the resistance to rotation afforded by the frictional connecting means constituted by the washer 9 and the nut 10. The second position of the rod 16 is a withdrawn position freeing the line (shown in broken lines) in which the winding-up rod 16 is disposed out of contact with the line $f$ so that the latter can unwind freely from the stationary spool 8.

The handle 1 is provided with a mechanical control device actuated by a push button 17 retained and mounted for sliding movement in a mounting 18 secured on the handle 1. The latter is open at $1^1$ to permit the passage of the push button 17 and to allow it to co-operate with a bellcrank lever 19 pivotable at $19^1$ about an inner prolongation of the mounting 18. The arm $16^3$ of the lever 19 is in the form of a two pronged fork, the prongs being disposed on either side of the shaft 6, their free ends contacting a ring 20 which is adapted to slide longitudinally on the shaft 6 when the button 17 is pressed. Rods 21, which are two or more in number, are secured to the ring 20. These rods are freely slidable through the bearing element 2 and the ferrule 4. The ends of the rods 21 project beyond the bearing 2 and the ferrule 4 and are secured to a thrust disc 22. Springs 23 are mounted about the rods 21 and are interposed between the bearing element 2 and the ring 20. Springs 23 urge the disc 22 against the ferrule 4, and move the ring 20 rearwardly away from the drum 14, to cause pivoting of the lever 19 and raising of the push button 17 subsequent to release of the push button after displacement thereof.

A contact plate 24 is mounted between the drum 14 and the disc 22, about the shaft 6, and the plate 24 is adapted to slide longitudinally on the said shaft. Secured to the plate 24 are rods 25 which are at least two in number, and each of which is provided with a shoulder $25^1$ adapted to slide within peripheral perforated bosses $14^1$ in the drum 14. The said bosses $14^1$ are closed at their free ends, for example, by means of screws 26. Springs 27 are disposed between the screws 26 and the shoulders $25^1$ so as to urge the rods 25 and the plate 24 to a position wherein the said plate is in the immediate proximity of the thrust disc 22.

As illustrated in FIGURES 5 and 6, one end of a link 28 is pivotally connected at $28^1$, for example, to the periphery of the plate 24. The other end of the link 28 is pivotally connected at $28^2$ to a short lever 29 which in turn is secured to the rod 16 at $16^1$ and which lever 29 is capable of turning the rod 16 around an axis passing through $16^1$ and $16^1$.

This makes it possible by depressing the push button 17, to pivot the winding-up rod 16 in such manner as to put it in a withdrawn position (FIGURE 6) allowing the line to unwind about the stationary spool 8. When pressure on the button 17 is released the rod 16 automatically returns to the line-winding up position (FIGURE 1) under the thrust of the springs 23 and 27. To facilitate the return of the rod 16 into the winding-up position, the return pivoting movement of the lever 29 is supplemented by a spring consisting of a wire or the like which is mounted about the pivot $16^1$ and is secured at one end to the drum 14, so that its other end acts against the lever 29. A stop means limiting the forward pivoting of the lever 29 may also be provided on the drum 14. It should be emphasised that when a pivoting action is exerted on the rod 16 so as to free the line, the drum 14 is not driven in rotation.

The assembly is appropriately dimensioned, notably with regard to the travel of the plate 24 and the eccentricity of the link at $28^2$ relative to the pivot $16^1$, so as to ensure the necessary angular pivoting of the winding-up rod 16, as illustrated.

The crank mechanism which simultaneously produces, on the one hand the rotation of the shaft 6 and of the drum 14 with the rod 16 and, on the other hand, the reciprocal displacement of the spindle 7 and of the spool 8, is mounted at the rearward end of the handle in the casing 3. This mechanism is of known type.

Mounted and keyed on the rearward end of the shaft 6 is a bevel gear 30 which meshes with a bevelled toothed wheel 31. The axis of the wheel 31 is disposed at right angles to the shaft 6 on a shaft 32 rotatably mounted in a cover 33 closing the casing 3. Externally, a crank 34 is secured to the shaft 32. The casing 3 has a lateral boss $3^2$ housing the bevel gear 30 and the rear end of the spindle 7. The latter is prolonged into the casing beyond the shaft 6 and its end is notched so as to exhibit a flat upon which is secured a member 35 formed with a diametral groove $35^1$ which is disposed at right angles to the spindle 7.

The wheel 31 has a pin $31^1$ the position of which is eccentric relatively to the axis of the said wheel. The said pin $31^1$ is engaged in the groove $35^1$ which enables the wheel 31 and the shaft 6 to rotate displacing the spindle 7 laterally of the said shaft 6 in a reciprocal movement.

Provision is made for the unidirectional entrainment, at will, of the shaft 6 by means of the crank 34 or, on the contrary, for entrainment in both directions of rotation. This is achieved in known manner by the provision of a pawl 36 adapted to be disengaged against the thrust of a spring, with the aid of a small external lever 37. The pawl is adapted to co-operate with a ratchet 38 secured to the toothed wheel 31.

There is also a protective and decorative cap 39, shown for example in broken lines (FIGURE 1) and secured on the ferrule 4 in such manner as to fit with suitable play about the rotation drum 14 in a way which will protect the mechanism controlling the freeing of the line.

A second embodiment of the present invention is illustrated in FIGURES 7 to 10 and comprises a tubular element or handle 40, each end of which has disposed therein a bearing. The forward end of the handle 40 is provided with a bearing element 41 secured in a known manner and prolonged in the form of a wide protective cap $41^1$ which covers and protects the control mechanism described hereinbelow. The rearward end of the handle 40 is provided with a bearing element $42^1$ and a casing 42 in which is mounted means for winding the line by a crank 43. A cover 56 closes the casing 42.

The entrainment mechanism is similar to the one hereinbefore described and is adapted to move a spindle 46 reciprocally of the shaft 54 in the same manner as the spindle 7 is moved by the entrainment mechanism of the first embodiment. To this end the spindle 46 has secured thereto a member having a groove $46^1$ which is disposed at right angles to the spindle 7. A stud $44^1$ formed on a bevel gear-wheel 44 is slidably mounted within the said groove $46^1$. The bevel gear-wheel 44 co-operates with a bevel gear 45 both of which are formed with teeth and the wheel 44 is connected to a crank 43 through the intermediary of an interconnecting shaft. The forward end of the spindle 46 has frictionally secured thereabout a line-carrying spool 47 by means of a threaded element 49 which bears against the said spool 47 through the intermediary of a spring washer friction device 48 and a disc 50, urging the spool 47 against a toothed wheel 52 secured to the spindle 46. A washer 51 secured to the spool 47 retains the disc 50 and the spring 48 in their seating in the spool 47. A "click" system or other audible means for indicating that the force between the spool and the spindle has been overcome consists of the toothed wheel 52 which co-operates with a rod or resilient blade 53 disposed laterally of the spool 47.

The crank 43, the wheel 44 and the bevel gear 45 are adapted to drive a hollow shaft 54, one end of which is secured by screws or the like to a bearing element 45¹ which is integral with the bevel gear 45. A sleeve 55 is disposed between the bearing elements 42 to provide in conventional fashion a bearing surface between the elements 42 and 45. The bearing element 42¹ and the sleeve 55 have holes formed therein allowing for the positioning of the screws securing the bearing element 45¹ to the shaft 54.

The forward end of shaft 54 is adapted to rotate within the bearing 41. A drum 57 is rigidly secured to and is adapted to rotate therewith. One end of a pick-up rod or basket handle 58 is secured to the drum 57 by means of a screw 57¹, the other end of which is secured to a control lever 59 by means of an eyelet 59¹, the control lever 59 being pivotally mounted on the drum 57 and 57². The screws 57¹ and 57² are disposed on either side of the drum 57 in diametrically opposite manner.

The pick-up rod is of semi-circular shape and is formed near that end which is secured to the eyelet 59¹ with a tapered groove over which the line is adapted to run.

A mounting 61 is provided on the casing of the handle 40 and is secured thereto by means of screws or the like. This mounting 61 retains a push-button 60 in such a manner that it is capable of being depressed in a direction perpendicular to the general axis of the handle. The outer end of the push-button 60 may be provided with a broad headed screw 60¹ which facilitates manipulation of the push-button 60. Secured to, or integral with, the mounting 61 is a projection 61¹ having a hole formed therein through which passes a pivot pin. About this pivot pin a bell crank lever 62 is turnably mounted. One arm, being the shorter arm, of the lever 62 is in abutting engagement with the lower part of the push-button 60 and the other, longer arm, is deformed to allow free movement of the shaft 54. The free end of this longer arm of the lever 62 contacts a ring 63 having secured thereto rods 64. The rods 64 are slidably mounted in the bearing element 41, and the ends of the rods project beyond the bearing 41 and are being secured to a thrust disc 65. A spring 70 is disposed between the bearing element 41 and the ring 63 to urge the ring 63 against the longer arm of the lever 62 so that the shorter arm of the lever 62 is always in contact with the push-button 60. The lever 62 is formed so that the push-button 60 need only travel a short distance to produce movement of the ring 63 in a direction axially of the shaft 54. The said axial movement of the ring 63 is through a distance which is relatively longer than the distance through which the push-button 60 moves.

Secured to, or integral with the drum 57 are sector-shaped portions 57⁴ extending rearwardly therefrom which form slideways 57³ (see FIGURE 9). These channels or slideways serve as guides for a contact plate in the form of a circular dished member 66 which is disposed in close proximity to the thrust disc 65. The dished-member 66 has disposed on either side of it in diametrically opposite relationship screws which form pivots 66¹. The pivots 66¹ are adapted to move freely by mounting them on rollers 67, which are adapted to roll in the slideways 57³. The rollers 67 in the slideways 57³ constitute a roller means for the member 66 and enable the latter to slide axially of the tubular handle. A link arm 68 connected to the dished-member 66 by means of a freely articulated mounting on one of the pivots 66¹ is pivotally connected to the lever 59 by means of a freely articulated connection 59². Hence any axial movement of the dished-member 66 will cause corresponding lateral movement to the eyelet 59¹ relatively to the shaft 54.

A spring 69 is mounted about the shaft 54 between the drum 57 and the dished member 66. This spring 69 urges the dished-member 66 towards the thrust disc 65. It therefore will be seen that the lever 59 and the basket handle 58 will be held in the line winding-up position. When operating the control means for the pick-up rod 58 by depressing the push-button 60 the lever 62 will be pivoted in a clockwise direction thereby displacing the ring 63 against the action of the spring 70. This will produce an axial displacement of the thrust disc 65 causing it to contact the dished-member 66 thrusting it axially of the shaft 54 against the action of the spring 69 causing the link arm 68 to pivot the cam lever 59 about the screw 57² to move the pick-up rod 58 through an arc into the free line position whereupon the line may unwind about the forwardly disposed shoulder of the spool 47. A reverse movement of the control means takes place when the push-button 60 is released so that the pick-up rod 58 will return to the line winding position, whereupon the line is only unwound from the spool 47 when the pull on the line is of sufficient magnitude to overcome the resistance of the frictional means securing the spool 47 to the spindle 46.

A radial extension of the drum 57 in the form of a collar 57⁵ is provided rearwardly of said drum in such a way that its periphery lies in close proximity to the cap 41¹ of the bearing 41. The collar 57⁵ thus closes the aperture formed by the cap 41¹ and encloses the mechanism therein. The collar 57⁵ is however open for the passage of the link 68 and the lever 59.

The cap 41¹ may be made integral with or secured to the bearing 41 and may be formed with, or have secured thereto a bearing element 41² adapted to receive the stem of a casting rod.

What I claim is:

1. A handle and reel combination comprising a tubular handle, a hollow shaft rotatably supported in said handle, a spindle supported within said hollow shaft for movement axially of the shaft, a drum coupled to said shaft for rotating therewith, a winding-up rod supported on said drum and pivotable relative to said drum, a spool, means frictionally connecting the spool to said spindle for axial movement therewith, a crank mechanism for rotating said shaft and reciprocating the said spindle, and control means in said handle for pivotably moving the winding-up rod between operative and free-line positions, said crank mechanism being adapted for rotatably driving the shaft, drum and winding-up rod while reciprocating said spindle to cause winding of line on said spool with said winding-up rod in the operative position, said control means pivotably moving the winding-up rod to a free-line position whereat line can be unwound from said spool without contacting said winding-up rod, said control means comprising a push button, a bell crank lever in contact with said button and movable thereby, a ring engaged by said bell crank lever and movable thereby, slidable rods secured to said ring, a thrust disc, a spring between the thrust disc and ring biassing the latter rearwardly away from said drum, a contact plate adjacent said thrust disc, said thrust disc being secured to said rods for being displaced therewith to engage said contact plate with said button pressed and displace the same, and means pivotally supported from said contact plate and coupled to the winding-up rod for moving the winding-up rod between the operative and free-line positions.

2. A handle and reel combination as claimed in claim 1, wherein the means for moving the winding-up rod comprises a link pivotally connected to the contact plate and a lever secured to the winding-up rod, said link being pivotally connected to said lever.

3. A handle and reel combination as claimed in claim 2, comprising roller means extending axially of the tubular handle between the thrust disc and the drum for slidably supporting the contact plate.

4. The combination as claimed in claim 1, wherein the control means includes means constituting a pivotal mounting on the contact plate for supporting the means for moving the winding-up rod, the latter said means including a link having one end pivotally connected to the pivotal mounting, and a lever coupled to the winding-up rod, said link having an end opposite to the first said end coupled to the lever.

References Cited in the file of this patent

UNITED STATES PATENTS

| | | |
|---|---|---|
| 1,053,871 | Purdom | Feb. 18, 1913 |
| 2,498,987 | Duncan | Feb. 28, 1950 |
| 2,628,444 | Oak | Feb. 17, 1953 |
| 2,658,697 | Steinbaugh | Nov. 10, 1953 |
| 2,705,113 | Bonanno | Mar. 29, 1955 |
| 2,736,979 | LeGal | Mar. 6, 1956 |
| 2,834,559 | Nagy | May 13, 1958 |
| 3,032,290 | Wallace | May 1, 1962 |